UNITED STATES PATENT OFFICE.

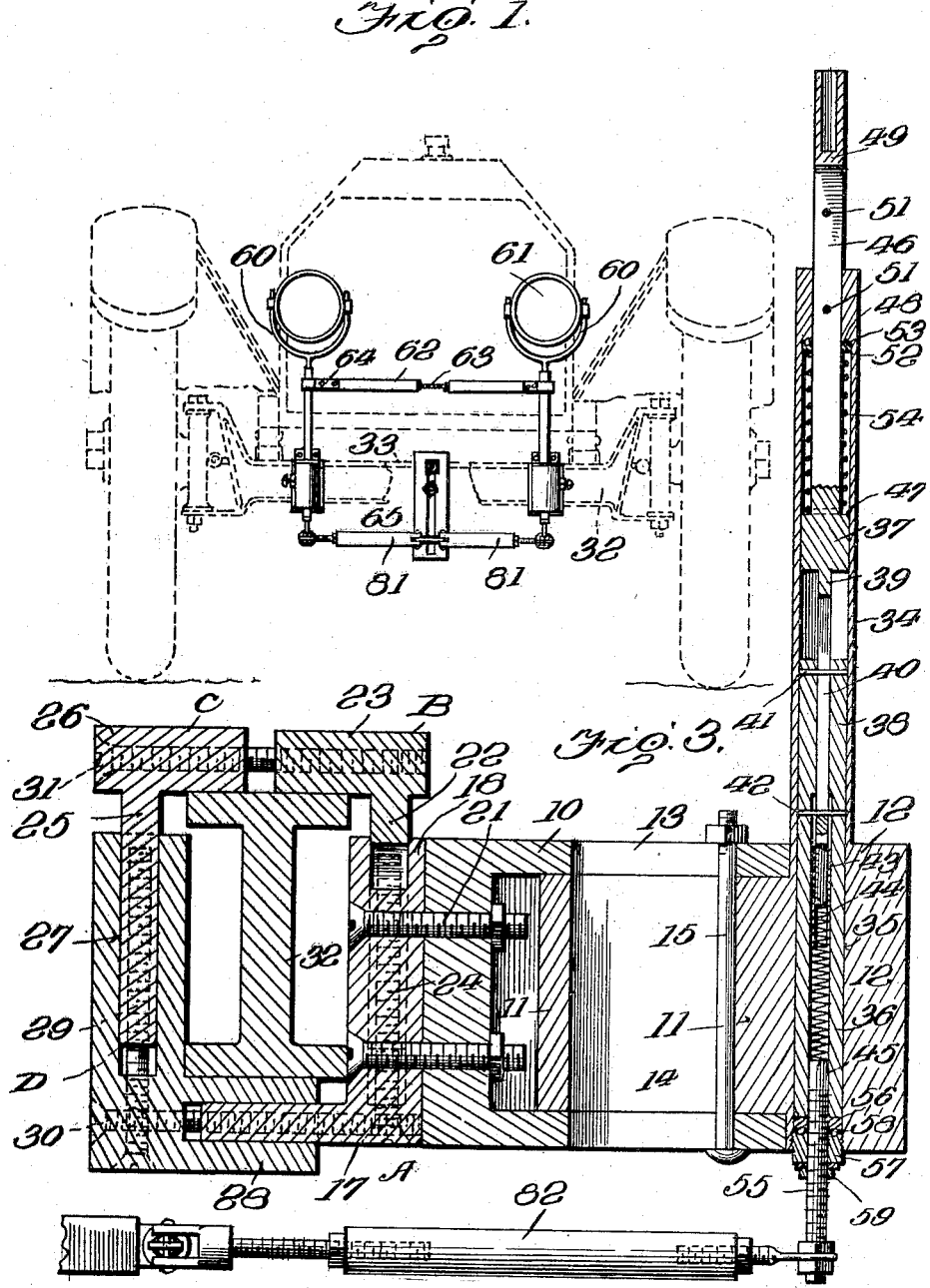

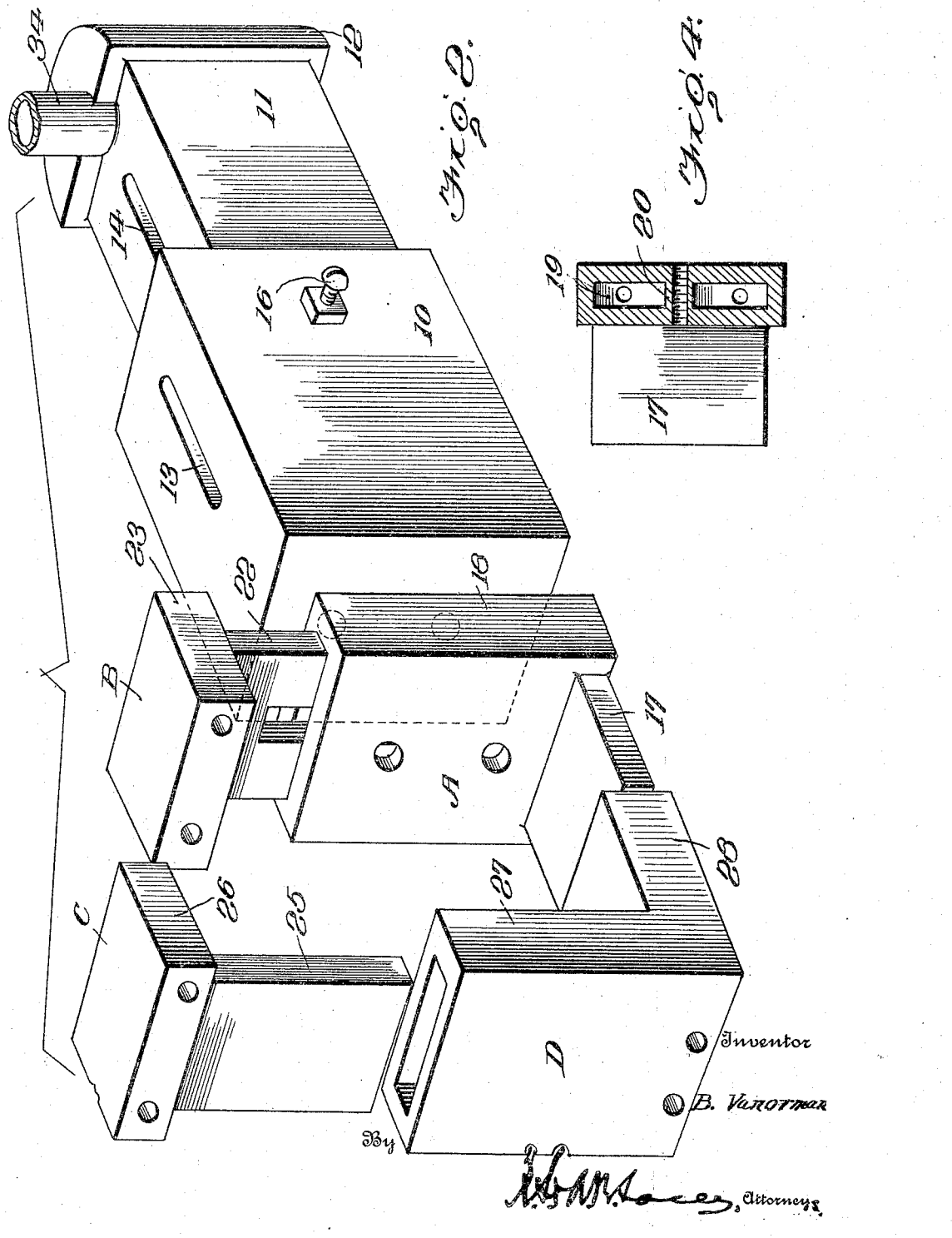

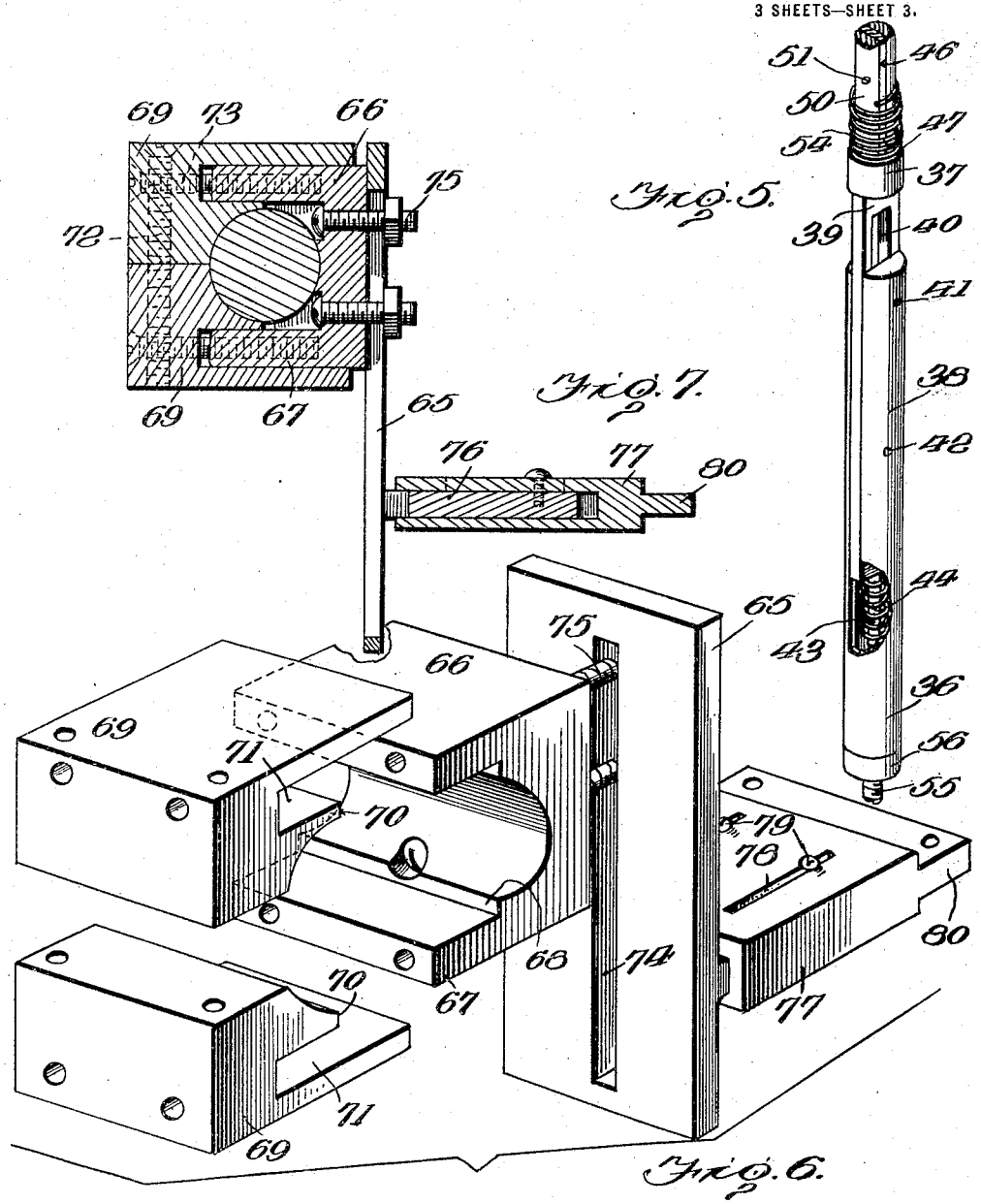

BUD VANORMAN, OF MASON CITY, ILLINOIS.

DIRIGIBLE HEADLIGHT MECHANISM.

1,206,623.

Specification of Letters Patent.

Patented Nov. 28, 1916.

Application filed February 7, 1916. Serial No. 76,650.

*To all whom it may concern:*

Be it known that I, BUD VANORMAN, a citizen of the United States, residing at Mason City, in the county of Mason and State of Illinois, have invented certain new and useful Improvements in Dirigible Headlight Mechanism, of which the following is a specification.

This invention contemplates an improved dirigible headlight mechanism and has as its primary object to provide a construction which may be readily employed in connection with any conventional type of motor vehicle for directing the headlights thereof as the vehicle is steered.

The invention has as a still further object to provide an adjustable connection for attaching the headlight supporting brackets to the vehicle.

A further object of the invention is to provide an improved form of adjustable clamping member for operatively connecting my improved mechanism to the drag rod or connecting bar of the vehicle steering gear.

The invention has as a further object to provide adjustable headlight supporting brackets of such character that the headlights may be positioned either toward or away from the front of the vehicle. And a still further object of the invention is to provide an improved type of lamp receiving post which will be mounted to freely turn upon anti-friction devices and which will be adapted to cushion the headlight carried thereby against vertical movement in each direction, so that jars upon the vehicle or the vibration thereof will not be communicated to the headlight and the said headlight thus supported to throw a steady stream of light.

Other and incidental objects will appear as the description proceeds and in the drawings wherein I have illustrated the preferred embodiment of the invention and wherein similar reference characters designate corresponding parts throughout the several views. Figure 1 is a front elevation showing my improved mechanism applied to a conventional type of motor vehicle, Fig. 2 is a perspective view, partly broken away, showing one of the post supporting brackets detached and the attaching clamp associated therewith for connecting the bracket to the front axis of the vehicle, Fig. 3 is a sectional view taken through one of the post supporting brackets and more particularly showing the construction thereof and the construction of the attaching clamp associated therewith as well as the construction and mounting of the lamp receiving post carried by the said bracket, Fig. 4 is a sectional view taken through one of the elements of the attaching clamp and particularly showing the detailed construction thereof, Fig. 5 is a fragmentary perspective view showing one of the lamp receiving posts detached, Fig. 6 is a perspective view of the attaching clamp employed for connecting my improved mechanism to the drag bar or connecting bar of the vehicle steering mechanism, and Fig. 7 is a sectional view showing the manner in which the said attaching clamp is adapted to engage the said bar.

In carrying out my invention, I employ co-acting post supporting brackets with each of which is associated an attaching clamp. One of these brackets and its attaching member is particularly shown in Figs. 2 and 3 of the drawings and since the said brackets are identical in construction as are also the attaching clamps, only one of the brackets and its attaching clamp will be described.

Referring now particularly to Figs. 2 and 3 of the drawings, it will be noted that the post supporting bracket illustrated therein is formed of telescopic sections 10 and 11. The section 10 is in the nature of a block or sleeve recessed to slidably receive the section 11 which, at its outer extremity is provided with a terminal head 12 adapted to abut the outer end of the head for limiting the section 11 in its inward shifting movement therein. The section 10, upon opposite sides thereof is formed with alined elongated openings 13 which register with a similar elongated opening 14 formed in the section 11. Extending freely through the openings 13 and 14 and adjustably connecting the section 11 with the section 10 is a bolt or other suitable fastening device 15. Mounted upon one side of the section 10, adjacent its outer extremity, is a set screw 16 operable to engage the section 11 to co-act with the bolt 15 for holding the said section at adjustment.

Mounted upon the inner extremity of the section 10 is an attaching member which consists of four detachably connected angle members A, B, C, and D respectively adapted to coact to form a substantially rectangular clamp. The member A which is shown in detail in Fig. 4 of the drawings, is formed of angularly disposed portions which respectively provide a tongue 17 and a sleeve 18. The tongue 17 is preferably solid while the sleeve 18 is formed with spaced longitudinally extending recesses 19 which are separated by a web 20. Detachably connecting the member A with the section 10 are longitudinally spaced bolts, or other suitable fastening devices 21, these bolts being threaded through the web 20 and through the adjacent end of the said section to project into the recess formed therein and, as will be best observed upon reference to Fig. 3, the inner extremity of the section 11 is cut away or recessed to freely receive the inner terminals of the said bolts. The section B is carried by the section A and includes angularly disposed portions which respectively provide a longitudinally slotted tongue 22 and a head 23. The tongue 22 is preferably solid and the arms thereof are adapted to slide freely within the recesses 19 of the sleeve 18 of the section A with the web 20 received within the slot of the tongue. Adjustably connecting the section B with the section A, are spaced bolts or other suitable fastening devices 24 which, as best shown in Fig. 3, extend freely through the outer end of the sleeve 18 and are screw threaded into the arms of the tongue 22. The head 23 of the section B is also preferably solid. The member C is somewhat similar to the member B and includes angularly disposed solid portions which respectively provide a tongue 25 and a head 26. The member C is carried by the member D. This latter member includes angularly disposed portions which are each longitudinally recessed to respectively provide a sleeve 27 and a sleeve 28. The sleeve 27 is adapted to freely receive the tongue 25 of the member C while the sleeve 28 is adapted to freely receive the tongue 17 of the member A. Adjustably connecting the member C with the member D are spaced bolts or other suitable fastening devices 29 which, as best shown in Fig. 3, extend freely through the outer end of the sleeve 27 and are screw threaded into the tongue 25. Adjustably connecting the member D to the member A are spaced bolts or other suitable fastening devices 30 which extend freely through the outer end of the sleeve 28 and are screw threaded into the tongue 17. The head 26 of the member C is adapted to coact with the head 23 of the member B and adjustably connecting the said members are spaced bolts or other suitable fastening devices 31 which, as best shown in Fig. 3, extend freely through the head 26 and are screw threaded into the head 23.

From the preceding description, it will be seen that the several members of the attaching clamp are lineally adjustable relative to each other to vary the internal dimensions of the clamp so that either the width or height of the clamp may be varied.

In order that the mounting of my improved mechanism may be clearly understood, I have shown the said mechanism in connection with a conventional type of motor vehicle having a front axle 32 and including as a part of the steering gear thereof, a drag rod or connecting rod 33 operatively attached at its extremities to the steering knuckles of the vehicle. The attaching clamps of the post supporting brackets are fitted about the axle 32 in the manner best shown in Fig. 3 of the drawings with the said brackets extending forwardly from the said axle in spaced relation to each other. As will be readily understood, the fastening devices 24, 29, 30, and 31, may be operated to easily bind the members of the attaching clamps about the said axle, and since the said clamps are each adjustable to vary either their width or height, said clamps may be readily fitted to axles of different sizes. Thus, my improved mechanism may be attached without difficulty to automobiles of various makes.

Mounted upon the outer extremities of the sections 11 of the brackets, are upstanding tubular casings 34. These casings may be secured to the sections 11, in any suitable manner, or may be made integral therewith as illustrated in the drawings, being arranged to surround openings 35 extending transversely through the said sections. Mounted within the casings 34 to extend through the said openings, are the lamp receiving posts, a portion of one of which is shown in detail in Fig. 5 of the drawings. These posts are identical in construction and accordingly, only one will be described, particular reference being had to Figs. 3 and 5. Each of the lamp receiving posts is formed of telescopic sections 36 and 37 respectively. The section 36 which forms a cylindrical hollow body portion for the post is bifurcated adjacent its upper extremity to form spaced arms 38. The section 37, adjacent its lower extremity is reduced or flattened to provide a longitudinally extending arm or tongue 39 which is slidably received between the arms 38 of the section 36. The tened to provide a longitudinally extending extending slot 40 and extending freely through said slot are pins 41 and 42 respectively, connecting the section 37 with the section 36, these pins extending through the arms 38 of the said last mentioned section and being arranged in longitudinal spaced relation thereon. At its lower end, the tongue 39 is provided with a reduced terminal or pin 43 adapted to project freely within the hollow section 36 and which receives the upper end of a helical spring 44 surrounding the said terminal and bearing between the lower end of the tongues 39 and a suitable plug 45 removably fitted within the lower extremity of the section 36. The spring 44 is adapted to normally urge the section 37 upwardly upon the section 36 to a position with the pin 42 engaging within the lower end of the slot 40 formed in the tongue 39.

Adjacent its upper extremity, the section 37 is reduced to provide a longitudinally extending arm or tongue 46 at the inner end of which is formed a shoulder 47. This arm 46 projects freely through the upper end of the casing 34 which is reduced to receive the said arm and is formed with an annular shoulder 48 in which is provided a suitable raceway. Connected to the arm 36 is a socket member 49 suitably formed at its upper end to detachably receive a forked lamp bracket. At its lower extremity, the socket member 49 is bifurcated to provide longitudinally extending arms 50, as best shown in Fig. 5, adapted to freely embrace the arm 46. The socket member 49 is thus telescopically mounted upon the section 37 of the lamp receiving post and adjustably connecting the said socket member therewith are a plurality of screws or other suitable fastening devices 51 which preferably, at longitudinally spaced points, extend through the arms 46 and 50 of the said section and socket member respectively. Freely surrounding the upper extremity of the section 37 and receiving the arms 50 of the socket member 49 is a collar 52 in the upper face of which is formed a suitable raceway coacting with the raceway formed in the shoulder 48 of the casing 34 to receive a plurality of balls or anti-friction devices 53. Bearing between the collar 52 and the shoulder 47 of the section 37 is a helical spring 54 which surrounds the upper extremity of the section 37 and is adapted to also freely receive the arms 50 of the socket member 49. Particular attention is now directed to the manner in which the springs 44 and 54 are adapted to coact for cushioning the vertical telescopic movement of the section 37 of the lamp receiving post upon the section 36. The weight of a lamp connected to the upper end of the socket member 49 will tend to shift the section 37 downwardly upon the section 36 which will then be cushioned by the spring 44 acting to urge the section 37 upwardly. In this connection, it will be observed that the pin 41 is adapted to engage within the upper end of the slot 40 in the arm 39 of the section 37 for limiting the said section in its downward shifting movement. Consequently, as will now be understood in view of the previous description, the pins 41 and 42 constitute means for limiting the section 37 in its vertical shifting movement upon the section 36 in opposite directions.

The spring 44 will, under ordinary circumstances, effectively support the section 37 to receive the weight of a lamp connected to the socket member 49 so that jars upon the vehicle or the vibration thereof will not be communicated to the lamp.

The weight of the lamp will normally depress the section 37 within the casing 34 to a position with the lower end of the slot 40 spaced below the pin 42 and shock upon the vehicle tending to shift the socket member downwardly, will then be absorbed by the spring 44 which will be compressed under the influence of the said shock. To counteract the tendency of the section 37 to then rebound or shift upwardly within the casing 34, the spring 54 is provided and, as will be seen, as the section 37 tends to move upwardly, this spring will be compressed to cushion the said section. Consequently, the section 37 will normally float between the springs 44 and 54 to hold the lamp carried by the socket member 49 relatively steady regardless of the character of roadway over which the vehicle is passing so that the said lamp will throw an even and steady light upon the road surface.

Detachably connected to the lower end of the section 36 is a bolt or other suitable pin 55 which, at its upper extremity, is screw threaded into the lower end of the said section. Screw threaded upon the bolt 55 is a collar 56 arranged to abut the lower terminal of the section 36 and in the outer face of which is formed a suitable raceway. Freely mounted upon the pin 55 and removably fitted into the lower end of the opening 35, is a collar 57 screw threaded into the said opening and provided upon its inner face with a suitable raceway adapted to coact with the raceway formed in the collar 56 to receive a plurality of balls or other anti-friction devices 58. Screw threaded upon the bolt 55 to freely abut the collar 57 is a lock nut 59. As will now be clear, the lamp receiving post is supported between the anti-friction devices 53 and 58 to rotate thereon so that the said post may be easily turned.

The lamp receiving posts thus described are supported by the post brackets to project upwardly in front of the vehicle body in substantially parallel relation, and it will be observed that the sections 11 of the said brackets may be adjusted upon the sections 10 thereof to position the said lamp receiving posts either toward or away from the vehicle body. Detachably connected to the upper ends of the socket members 49 of the lamp receiving posts are suitable forked lamp brackets 60 which receive lamps or headlights 61 in the usual manner, the said lamps being conventionally illustrated. Extending between the casings 34, adjacent the upper extremities thereof, is a brace rod which is formed of terminal sections 62 adjustably connected by a turn-bolt or buckle 63. The sections 62, at the outer extremities thereof, are provided with suitable clips 64 adapted to detachably embrace the casings 34. At their inner extremities, the said sections are provided with reversely screw threaded bores to receive the bolt 63 so that upon the rotation of the said bolt, the sections may be adjusted either toward or away from each other.

Mounted upon the connecting bar 33 of the vehicle at a point substantially midway its ends, is a downwardly projecting arm or plate 65. The plate is connected to the said bar by an attaching member or clamp particularly shown in Figs. 6 and 7 of the drawings. This attaching clamp is formed of mating sections one of which provides the body portion of the said clamp and the other of which is formed of mating members adjustably connected to the body portion to coact therewith. The body section 66 of the clamp is in the nature of a block hollowed out upon one side to fit against the rod 33 and provided with laterally extending reduced portions or tongues 67 at the inner extremities of which are formed confronting shoulders 68. The section of the attaching clamp arranged to coact with the body section thereof, is formed of mating members 69 which, when assembled in operative position, provide a block substantially similar to the body block. However, the said members may be integrally formed if desired and upon the inner sides thereof, are cut away to fit against the bar 33 and to provide shoulders 70, the cut away portions of the said members being adapted to coact with the cut away portion of the body block 63 to provide a bore through the attaching clamp which receives the said bar.

Formed in the members 69 upon the inner sides thereof, are longitudinally extending slots or recesses 71 which freely receive the tongues 67 of the body block 66 as particularly shown in Fig. 7, with the shoulders 70 of the said members confronting the shoulders 68 of the body block and with the said members overlying the upper and lower sides of the body block and abutting each other at their outer extremities. Detachably connecting the outer extremities of the members 69 are spaced bolts or other suitable fastening devices 72 which extend freely through the uppermost member and are screw threaded into the lowermost member. Detachably and adjustably connecting the members 69 to the block 66, are pairs of spaced bolts or other suitable fastening devices 73, the said pairs of bolts being respectively fitted freely through the outer ends of the members and screw threaded into the tongues 67 of the said block. The bolts 73 are operable to urge the block provided by the members 69 toward the block 66 for holding the said blocks in coacting relation tightly clamped about the bar 33, and it will be noted that the shoulders 70 of the members 69 are adapted to abut the shoulders 68 of the body block 56 for limiting the said members in their inward shifting movement upon the said block. In thus adjustably connecting the members to the body block 66, the attaching clamp may be readily mounted upon the connecting bar of any conventional type of vehicle.

The plate 65 is formed with a longitudinally extending slot 74 and is adjustably connected to the attaching clamp by spaced bolts or other suitable fastening devices 75 which engage the body block 66 of the said clamp and project freely through the said slot. Extending laterally from the plate 65 adjacent the lower extremity thereof, is a forwardly projecting arm or tongue 76 upon which is slidably mounted a sleeve 77. The sleeve 77 upon the upper side thereof, is provided with spaced longitudinally extending slots 78 through which are freely fitted set screws 79 which engage the tongue 76 for adjustably connecting the said sleeve therewith. The sleeve 77 at its forward extremity is provided with a reduced extension or terminal 80 to opposite extremities of which are pivotally connected links 81. The links 81 are each formed of adjustably connected sections as particularly shown in Fig. 1 of the drawings and pivotally connected to the outer extremities of the said links, are links 82, one of which is shown somewhat in detail in Fig. 3 of the drawings. The links 82 are also each formed of adjustably connected sections and at their outer ends are fixed to the lower extremities of the bolts 55 of the lamp receiving posts.

As will now be seen, the plate 65 may be adjusted relative to the connecting bar 33 to properly support the links 81 and 82 relative to the lower ends of the lamp receiving posts, while the said links may also be adjusted to properly coöperate with each other and with the said posts, thus further adapting my improved mechanism for use in connection with any conventional type of vehicle. It will now be readily apparent that longitudinal movement of the connecting bar 33 will, through the attaching clamp connected to the said bar, the plate 65 and the links 81 and 82, correspondingly rotate the lamp receiving posts so that the lamps or headlights 61 will be directed as the vehicle is steered.

Having thus described my invention, what I claim and desire to secure by Letters Patent is:

1. A dirigible headlight mechanism having rotatable posts each including coacting sections with one of said sections providing a floating member adapted to operatively receive a lamp, and stop members carried by the other of said sections for limiting the said first mentioned section in its shifting movement in opposite directions, and means for rotating the said posts and adapted for attachment to an element of a vehicle steering gear whereby the said posts will be rotated as the vehicle is steered.

2. A dirigible headlight mechanism having rotatable posts, each of said posts including coacting sections one providing a floating member adapted to operatively receive a lamp, and opposed coacting means respectively housed in one of the sections and surrounding the other section with the said means acting to normally urge the said member in opposite directions, and means for rotating said posts and adapted for attachment to an element of a vehicle steering gear whereby the said posts will be rotated as the vehicle is steered.

3. A dirigible headlight mechanism having rotatable posts, each of said posts including a floating member adapted to receive a lamp, opposed coacting means normally acting to urge the said member in opposite directions, and spaced means extending through the member for limiting the said member in its movement, and means for rotating said posts and adapted for attachment to an element of a vehicle steering gear whereby the said posts will be rotated as the vehicle is steered.

4. A dirigible headlight mechanism having rotatable posts, each of said posts including telescopic sections, means for cushioning one of said sections in its movement upon the other section in opposite directions, and a socket member adjustable upon said first mentioned section and adapted to operatively receive a lamp, and means for rotating said posts and adapted for attachment to an element of a vehicle steering gear whereby the said posts will be rotated as the vehicle is steered.

5. A dirigible headlight mechanism having supporting brackets each formed of telescopic sections, means adjustably connecting the sections of each bracket, rotatable lamp receiving posts carried by said brackets, and means for rotating said posts and adapted for attachment to an element of a vehicle steering gear whereby the said posts will be rotated as the vehicle is steered.

6. A dirigible headlight mechanism having supporting brackets, attaching clamps associated with said brackets, each of said clamps including a plurality of adjustably connected coacting members, rotatable lamp receiving posts carried by the said brackets, and means for rotating said posts and adapted for attachment to an element of a vehicle steering gear whereby the said posts will be rotated as the vehicle is steered.

7. A dirigible headlight mechanism having supporting brackets, attaching clamps associated with said brackets, each of said attaching clamps including a plurality of angle members, and means adjustably connecting the said members for varying the internal dimensions of the clamp both laterally and longitudinally, rotatable lamp receiving posts carried by the said brackets, and means for rotating said posts and adapted for attachment to an element of a vehicle steering gear whereby the said posts will be rotated as the vehicle is steered.

8. A dirigible headlight mechanism having rotatable lamp receiving posts, and means for rotating said posts, said means including an attaching clamp having telescopic sections formed to receive the connecting bar of a vehicle steering mechanism and adapted for attachment thereto whereby a shifting of the said bar to steer the vehicle will rotate the said posts.

9. A dirigible headlight mechanism having rotatable lamp receiving posts, and means for rotating said posts, said means including an attaching clamp having a body section, and coacting members forming a section coacting with the body section, the said sections being formed to receive the connecting bar of a vehicle steering mechanism and being adapted for attachment thereto whereby movement of the said bar to steer the vehicle will rotate the said posts.

10. A dirigible headlight mechanism having coacting posts, anti-friction bearings rotatably supporting the said posts, each of said posts including a shiftable member adapted to receive a lamp, and means interposed between one of said bearings and the said member for cushioning the member in its upward shifting movement with the said means operatively supporting the said bearing, and means for rotating the posts and adapted for attachment to an element of a vehicle steering gear whereby the said posts will be rotated as the vehicle is steered.

11. A dirigible headlight mechanism having rotatable posts each including coacting sections one providing a floating member adapted to operatively receive a lamp and having a slot formed therein, and spaced stop pins carried by the other of said sections and extending through said slot for limiting the said first mentioned section in its movement in opposite directions, and means for rotating the posts and adapted for attachment to an element of a vehicle steering gear whereby the said posts will be rotated as the vehicle is steered.

12. A dirigible headlight mechanism having supporting brackets each formed of coacting sections, rotatable lamp receiving posts carried by said brackets with the said sections thereof adjustable for positioning the said posts horizontally, and means for rotating the posts and adapted for attachment to an element of a vehicle steering gear whereby the said posts will be rotated as the vehicle is steered.

13. A dirigible headlight mechanism having rotatable lamp receiving posts, and means for rotating said posts, said means including an attaching clamp, a bar seating against the clamp and vertically adjustable thereon, and an operative connection between the said bar and the said posts with the said clamp adapted for attachment to the connecting rod of a vehicle steering mechanism whereby shifting of the said rod to steer the vehicle will rotate the said posts.

14. A dirigible headlight mechanism having rotatable lamp receiving posts, and means for rotating said posts, said means including an attaching clamp, a bar adjustable vertically upon the clamp, a tongue projecting laterally from said bar, a sleeve adjustable horizontally upon said tongue, and an operative connection between said sleeve and the said posts with the said clamp adapted for attachment to the connecting rod of a vehicle steering gear whereby shifting of the said rod to steer the vehicle will rotate the said posts.

15. A dirigible headlight mechanism having supporting brackets, casings carried thereby, posts mounted in said casings and formed of telescopic sections with the uppermost of said sections adapted to operatively receive lamps, anti-friction bearings carried by the said brackets and receiving the lowermost of said sections, anti-friction bearings received within the said casings, and means interposed between the said last mentioned bearings and the uppermost of said sections for cushioning the said uppermost sections in their upward movement with the said bearings rotatably supporting the said posts.

In testimony whereof I affix my signature.

BUD VANORMAN. [L. S.]

Copies of this patent may be obtained for five cents each, by addressing the "Commissioner of Patents, Washington, D. C."